US012005855B2

(12) United States Patent
Hu et al.

(10) Patent No.: US 12,005,855 B2
(45) Date of Patent: Jun. 11, 2024

(54) MACHINE LEARNING-BASED SEATBELT DETECTION AND USAGE RECOGNITION USING FIDUCIAL MARKING

(71) Applicant: NVIDIA Corporation, Santa Clara, CA (US)

(72) Inventors: Feng Hu, Santa Clara, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 214 days.

(21) Appl. No.: 16/905,418

(22) Filed: Jun. 18, 2020

(65) Prior Publication Data

US 2021/0394710 A1 Dec. 23, 2021

(51) Int. Cl.
*B60R 22/48* (2006.01)
*B60W 40/09* (2012.01)
(Continued)

(52) U.S. Cl.
CPC ............ *B60R 22/48* (2013.01); *B60W 40/09* (2013.01); *B60W 50/14* (2013.01); *G06N 20/00* (2019.01);
(Continued)

(58) Field of Classification Search
CPC ....... B60R 22/48; G06N 20/00; B60W 50/14; G06V 20/59
(Continued)

(56) References Cited

U.S. PATENT DOCUMENTS 10,303,961 B1    5/2019  Stoffel et al.
10,885,698 B2    1/2021  Muthler et al.
(Continued)

FOREIGN PATENT DOCUMENTS

CN    102555982 A     7/2012
CN    202518219 U    11/2012
(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Kam Wan Ma
(74) *Attorney, Agent, or Firm* — Taylor English Duma L.L.P.

(57) ABSTRACT

Systems and methods for machine learning based seatbelt position detection and classification. A number of fiducial markers are placed on a vehicle seatbelt. A camera or other sensor is placed within the vehicle, to capture images or other data relating positions of the fiducial markers when the seatbelt is in use. One or more models such as machine learning models may then determine the spatial positions of the fiducial markers from the captured image information, and determine the worn state of the seatbelt. In particular, the system may determine whether the seatbelt is being worn in one or more improper states, such as not being worn or being worn in an unsafe or dangerous manner, and if so, the system may alert the vehicle to take corrective action. In this manner, the system provides constant and real-time monitoring of seatbelts to improve seatbelt usage and safety.

22 Claims, 13 Drawing Sheets

(51) Int. Cl.
  *B60W 50/14* (2020.01)
  *G06N 20/00* (2019.01)
  *G06V 20/59* (2022.01)

(52) U.S. Cl.
  CPC ........ *G06V 20/59* (2022.01); *B60R 2022/485* (2013.01); *B60W 2050/146* (2013.01)

(58) Field of Classification Search
  USPC .......................................................... 701/45
  See application file for complete search history.

(56) References Cited

U.S. PATENT DOCUMENTS

| | | | |
|---|---|---|---|
| 10,953,850 B1* | 3/2021 | Pertsel | G06N 3/08 |
| 11,193,312 B1* | 12/2021 | Weng | G06V 20/59 |
| 11,295,471 B1* | 4/2022 | Bhuta | H04N 7/183 |
| 2015/0251618 A1* | 9/2015 | Ghannam | B60R 22/48 340/457.1 |
| 2016/0159320 A1* | 6/2016 | Andreen | B60R 22/48 382/103 |
| 2018/0211122 A1 | 7/2018 | Amico et al. | |
| 2019/0258263 A1* | 8/2019 | Wendel | B60N 2/002 |
| 2019/0340924 A1 | 11/2019 | Abari et al. | |

FOREIGN PATENT DOCUMENTS

| | | |
|---|---|---|
| CN | 103552538 A | 2/2014 |
| CN | 105946786 A | 9/2016 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
Hu, Feng; First Office Action for Chinese Patent Application No. 202110678300.5, filed Jun. 18, 2021, dated Aug. 22, 2023, 9 pgs. English Abstract Included.
Hu, Feng; Second Office Action for Chinese Patent Application No. 202110678300.5, filed Jun. 18, 2021, mailed Feb. 21, 2024, 11 pgs.
** English Abstract Included.

* cited by examiner

MACHINE LEARNING-BASED SEATBELT DETECTION AND USAGE RECOGNITION USING FIDUCIAL MARKING

BACKGROUND

Embodiments of the disclosure relate generally to machine learning systems. More specifically, embodiments of the disclosure relate to machine learning based seatbelt position detection.

SUMMARY

Seatbelts play an important role in traffic safety. Some estimate that seatbelt use reduces the number of vehicle crash-related serious injuries and deaths by approximately half, thus saving more than ten thousand lives in the United States alone. Despite the safety benefits and being mandated by law, seatbelt usage is not universal. Many drivers and passengers fail to wear seatbelts, whether accidentally or on purpose. In other instances, drives and passengers may wear a seatbelt, but do so improperly. Improper use of a seatbelt not only reduces the seatbelt's safety benefit, it may actually result in the wearer being injured by the seatbelt.

Accordingly, systems and methods are described herein for a machine learning based system that detects the seatbelt's position on the wearer, and determines whether the seatbelt is being worn properly. More specifically, the system can determine one of many specified states of the seatbelt, including for example whether the seatbelt is on and worn properly, incorrectly worn under the shoulder of the wearer, not being worn, or improperly worn behind the body of the wearer. These and many other states can be detected.

In some embodiments of the disclosure, the system employs a seatbelt with a number of fiducial markers located thereon, as well as a sensor such as a camera positioned to capture images or other fiducial marker position and orientation information. The system may also include an illumination source if desired, to increase the visibility of the fiducial markers. To that end, the sensors may be any type of sensor suitable for determining fiducial marker position and/or orientation information, such as a visible light sensor or camera, one or more infrared or near infrared sensors, or the like. The illumination source, if present, may thus be a visible light wavelength illumination source, an infrared or near infrared light source, or the like.

To determine seatbelt worn state, the camera or other sensor may be positioned to view the seatbelt of the passenger of interest, such as behind the driver seat or on the dashboard and oriented to face the driver. The sensor may then capture an image of the fiducial markers. One or more models such as machine learning models may then determine the positions of the fiducial markers from the captured image information, and determine the worn state of the seatbelt. As above, several different worn states can be determined. If the seatbelt is in an improper state, such as not being worn or being worn in an unsafe or dangerous manner, the system may alert the vehicle to take corrective action, such as alerting the driver or other passengers via an audible or visible warning, braking the vehicle, cutting off the ignition or otherwise turning one or more vehicle systems off, engaging an autopilot system, or the like. Any such vehicle actions are contemplated.

Additionally, various machine learning models are contemplated. As an example, one machine learning model may take in the sensor data (e.g., image data) as input, and generate the positions of the fiducial markers as output, while another machine learning model may take in this position information as input and generate classifications of the fiducial marker positions. These classifications may correspond to the above described seatbelt states. In this manner, systems of embodiments of the disclosure can automatically determine the state of a passenger's seatbelt from images of the passenger and his or her seatbelt, and provide an alert regarding improper seatbelt usage. The alert may be for various audiences, including the passengers, the vehicle, or a remote server logging seatbelt usage.

Embodiments of the disclosure also contemplate determination of other states and information from sensor data. For example, the sizes or positions of various vehicle components such as passenger seats, child seats or boosters, vehicle compartment contents, etc., may be determined. The vehicle may then, for instance, orient airbags or direct air vents accordingly, or may be alerted to improperly positioned seats. As another example, the size of passengers may be determined from seatbelt contours, i.e., the locations of the various fiducial markers as they contour to the passenger's body. This may indirectly inform the system of the weight of passengers, thus informing the vehicle if or how, for example, airbags should be deployed in case of a collision. As a further example, the position or pose of a passenger may be determined by the positions of the fiducial markers as they conform to passengers who move around in their seats. This may inform the vehicle as to, for instance, passengers that shift in their seats to a point in which their seatbelts are improperly or dangerously placed on their bodies, passengers who unbuckle their seatbelts while the vehicle is still moving, drivers who are turned around and thus not viewing the road, and the like. The vehicle may then take appropriate action, such as warning passengers to return to a proper position in their seats, warning the driver to pay attention to the road, and the like.

In some embodiments, it may be desirable for systems of the disclosure to be able to effectively handle occlusion of at least some of the fiducial markers, as in common usage there are often instances of occlusion. For instance, a passenger's hair may fall over the seatbelt and thus block sensors from perceiving the fiducial markers, loose clothing or hand gestures may similarly block fiducial markers, and the like. Machine learning models of embodiments of the disclosure may thus be trained using images in which at least some of the fiducial markers are partially or completely occluded. That is, a portion of the training set of images input to the machine learning model(s) of embodiments of the disclosure may be images in which at least some of the fiducial markers are partially or completely occluded. In this manner, the machine learning models of embodiments of the disclosure are trained to handle fiducial marker occlusion, thus providing more reliable classification results that remain accurate in a variety of real-world situations.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to machine learning systems and methods for machine learning based seatbelt position detection and classification. A number of fiducial markers are placed on a vehicle seatbelt. A camera or other sensor is placed within the vehicle, to capture images or other data relating to positions of the fiducial markers when the seatbelt is in use. One or more models such as machine learning models may then determine the spatial positions of the fiducial markers from the captured image information, and determine the worn state of the seatbelt. In particular, the system may determine whether the seatbelt is being worn in one or more improper states, such as not being worn or being worn in an unsafe or dangerous manner, and if so, the system may provide an alert, for example, so that the vehicle or a passenger may take corrective action. In this manner, the system provides constant and real-time monitoring of seatbelts to improve seatbelt usage and safety.

Figure 1A:
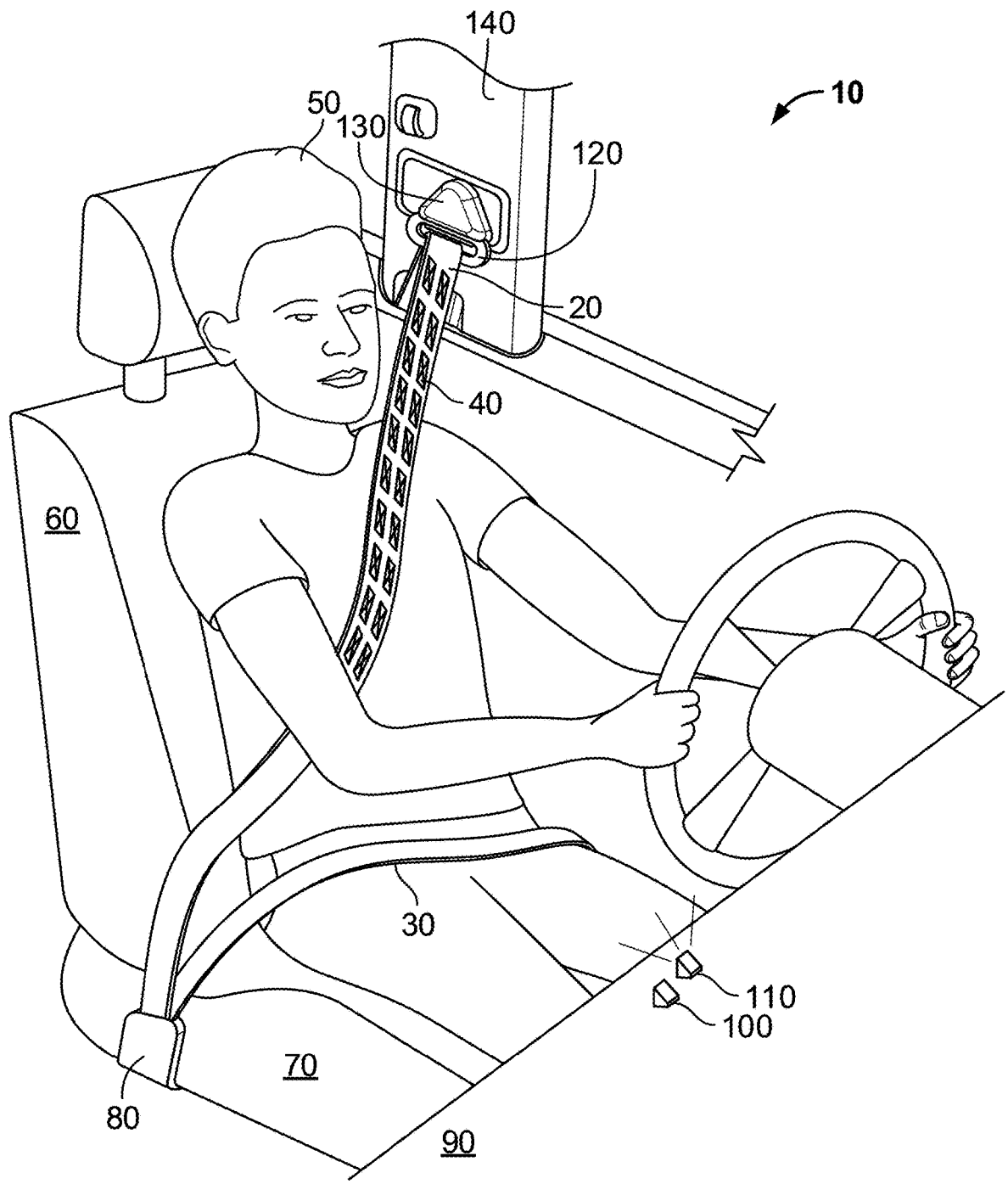
FIG. 1A conceptually illustrates a system for seatbelt position detection according to embodiments of the disclosure.

FIG. 1A conceptually illustrates a system for seatbelt position detection according to embodiments of the disclosure. Here, a vehicle seatbelt position detection system 10 includes a seatbelt 20 and lap belt 30, where the seatbelt 20 has a number of fiducial markers 40 imprinted or otherwise positioned thereon. In this embodiment, the fiducial markers 40 are positioned so that they lie both above and below the shoulder of driver 50 when the seatbelt 20 is worn properly. In this manner, positions of the fiducial markers 40 are able to contour to the upper body of driver 50 and thus convey their positions as well as, to a degree, position information of parts of the upper body of driver 50.

The vehicle of system 10 includes a seat with a backrest portion 60 and seatrest portion 70, as well as a buckle 80 for bucking seatbelt 20 and lapbelt 30. The seat 60, 70 helps maintain driver 50 in a comfortable and correct position for driving. The seatbelt 20 extends through a pulley 120 and into a winding mechanism, not shown, which helps keep the seatbelt 20 taut. The winding mechanism may be a known winding mechanism which mechanically applies and maintains tension to seatbelt 20, or may be a winding mechanism that applies tension to seatbelt 20 in response to determined positions of fiducial markers 40 as further described below. The pulley 120 is affixed to an anchor 130 which is coupled to a column 140 or another portion of the vehicle.

A sensor 100, which may be a visible light camera or any other sensor suitable for detecting positions of fiducial markers 40, is positioned on or in dashboard 90 to capture images of seatbelt 20 and fiducial markers 40. An optional illumination source 110 may also be positioned on or in dashboard 90 to illuminate fiducial markers 40 and thus facilitate capture of images or other position data by sensor 100. As above, sensor 100 may be any sensor capable of capturing information sufficient to determine position information of fiducial markers 40, such as a visible light sensor or camera, or a sensor detecting any other light wavelength. For example, the sensor 100 may be an infrared or near-infrared sensor, and illumination source 110 may be configured to emit light at corresponding wavelengths.

The fiducial markers 40 may be any markings capable of conveying position and, optionally, orientation information. To that end, they may be any shape having an appearance which varies with differing, but regular, spatial orientation or location. Examples may include, but are not limited to, letters of the alphabet or any other complex markings such as AprilTags or the like.

Figure 1B:
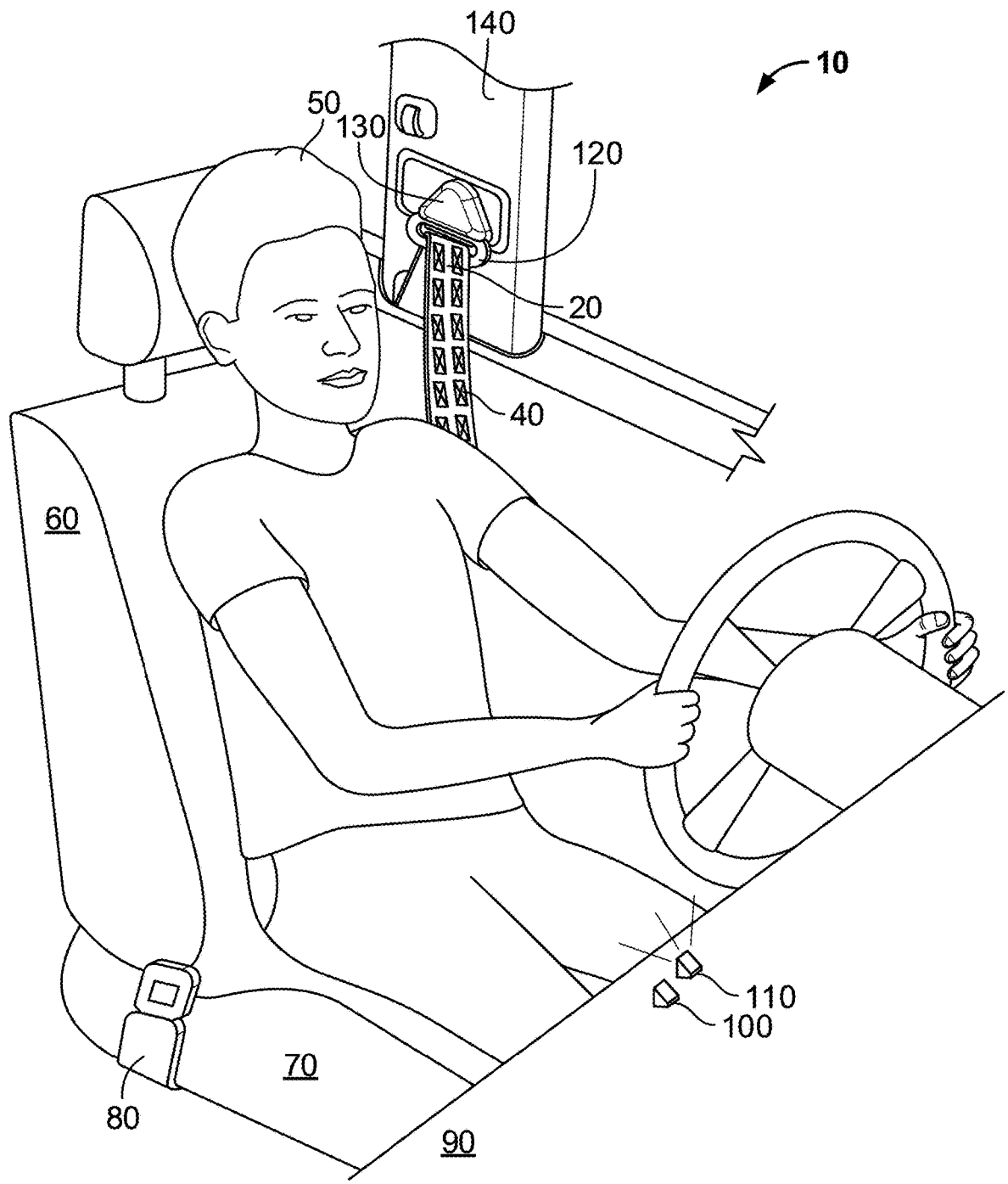
FIG. 1B conceptually illustrates detection of one improper seatbelt configuration according to embodiments of the disclosure.
Figure 1C:
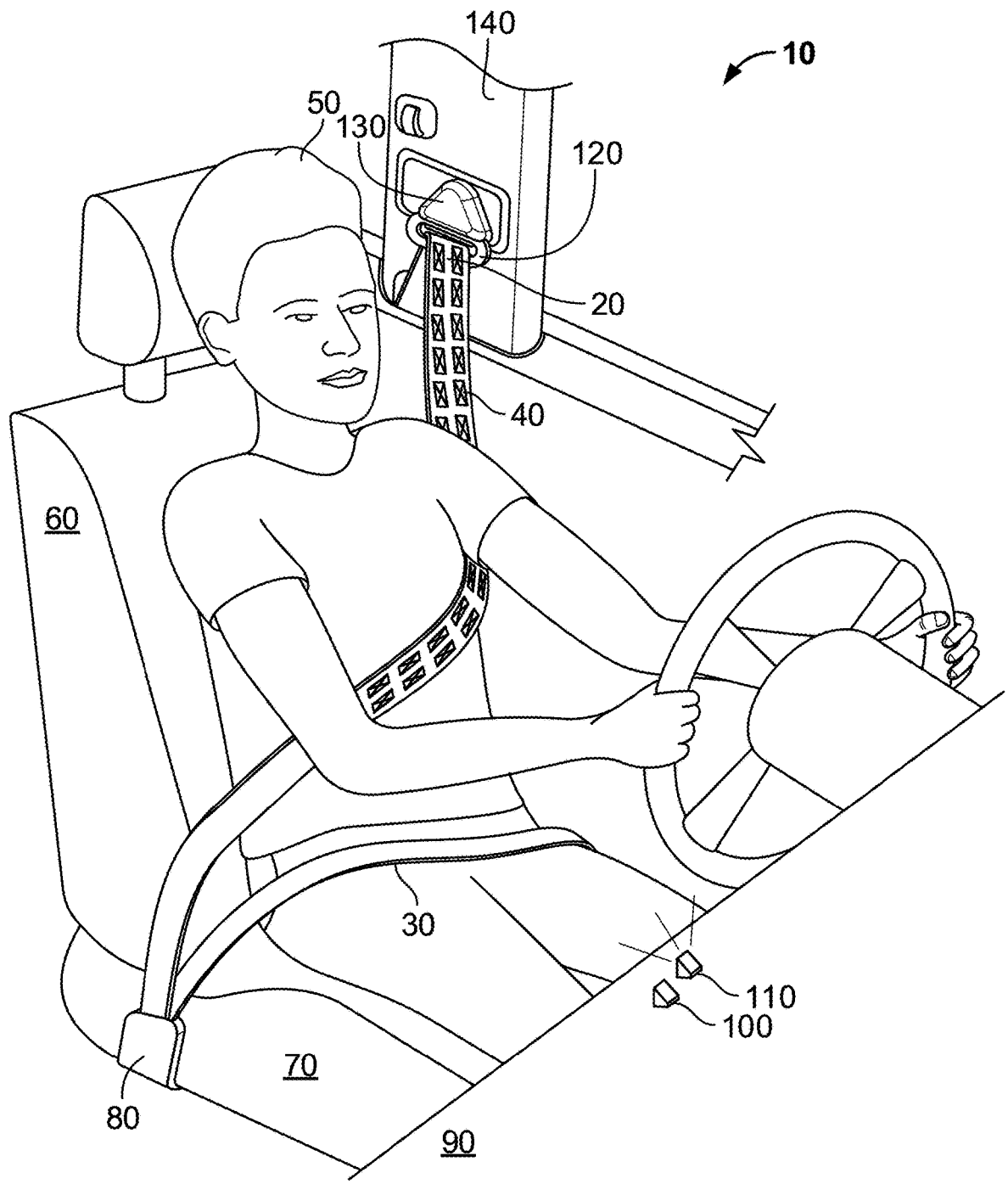
FIG. 1C conceptually illustrates detection of another improper seatbelt configuration according to embodiments of the disclosure.
Figure 1D:
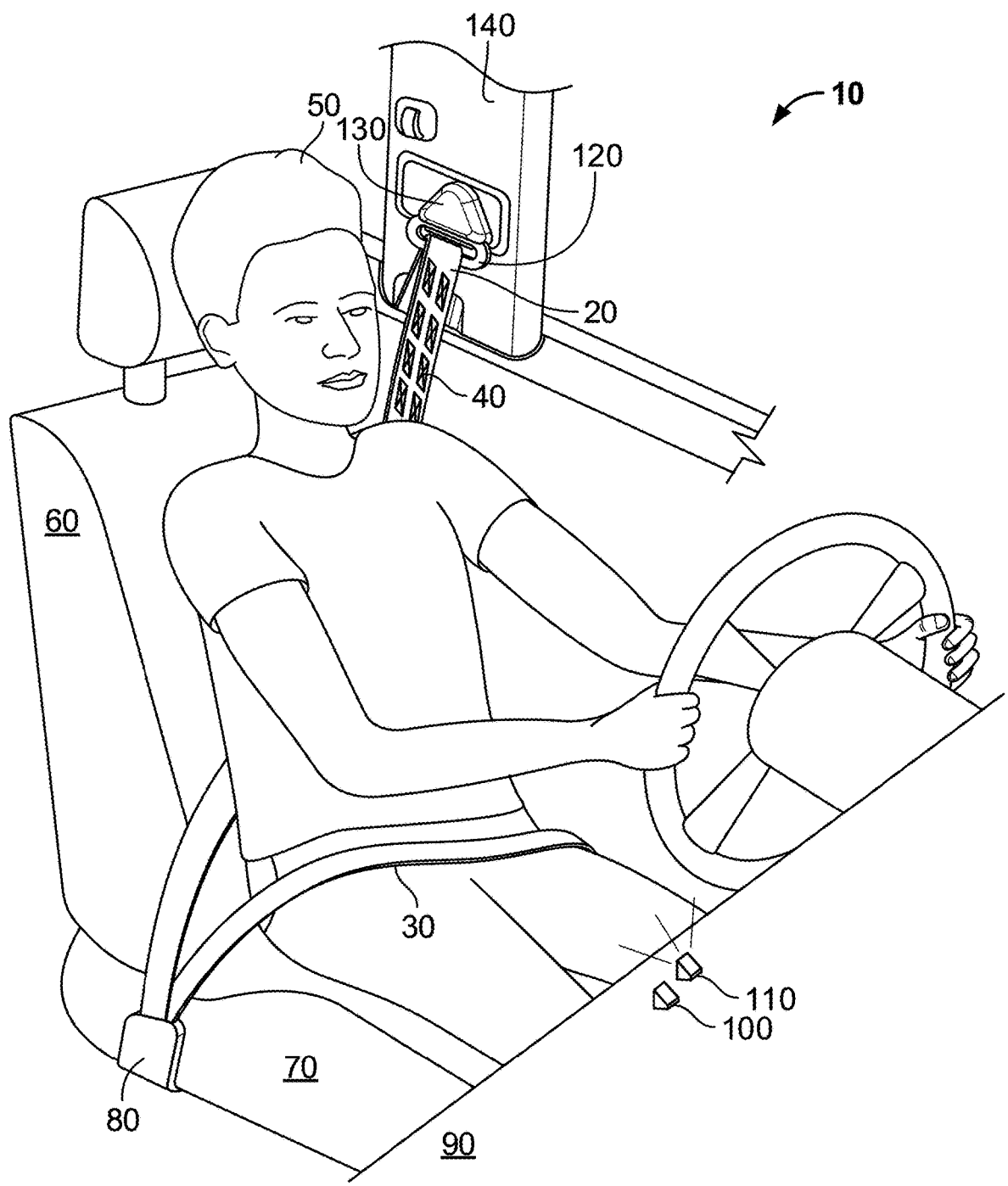
FIG. 1D conceptually illustrates detection of a further improper seatbelt configuration according to embodiments of the disclosure.

System 10 may be employed to detect any seatbelt 20 positions, including those indicating improper seatbelt 20 use. FIGS. 1B-1D conceptually illustrate exemplary seatbelt 20 positions that system 10 may detect and flag as improper use. In FIG. 1B, driver 50 has failed to wear his or her seatbelt 20. That is, FIG. 1B illustrates a case in which seatbelt 20 is not being used. This may occur when, for example, driver 50 forgets to wear his or her seatbelt 20, or when seatbelt 20 is intentionally not being used, perhaps with use of a known seatbelt simulator 120 that snaps into buckle 80 to prevent any vehicle alarms. Here, seatbelt 20 hangs downward instead of across driver 50, with the fiducial markers 40 thus characteristically appearing in an approximately vertical configuration extending along the left side of driver 50 and downward from pulley 120.

FIG. 1C illustrates another case, in which driver 50 is using seatbelt 20 but with seatbelt improperly extended underneath his or her left arm, rather than over his or her left shoulder. In this case, seatbelt 20 extends across driver 50 with fiducial markers 40 positioned lower than if seatbelt 20 were properly worn farther up driver 50 over his or her shoulder. Furthermore, as some fiducial makers 40 are blocked from view of sensor 100 by the left shoulder and upper arm of driver 50, the markers 40 would appear to sensor 100 as a lower, angled band of markers 40 and a discontinuous, upper and more vertically oriented band of markers 40.

FIG. 1D illustrates a further case, in which driver 50 is using seatbelt 20 but with seatbelt 20 improperly extended behind the back of driver 50 rather than along his or her front. In this case, lower fiducial markers 40 are blocked from detection by the body of driver 50. Thus, the markers 40 appear to sensor 100 as only a single, short angled band of markers 40 extending above the shoulder of driver 50.

Figure 2A:
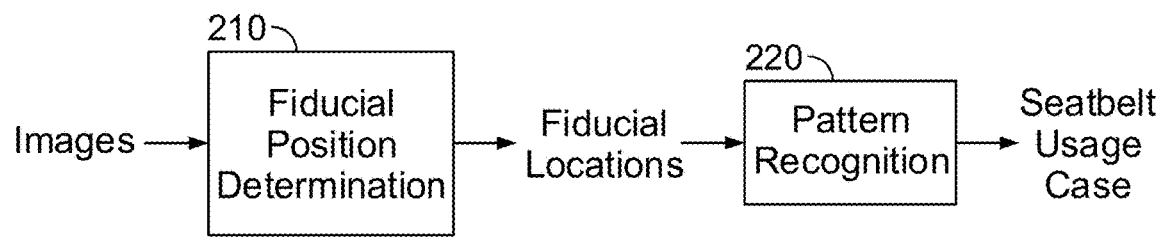
FIG. 2A is a block diagram representation of seatbelt position classification processes according to embodiments of the disclosure.

FIG. 2A is a block diagram illustrating operation of system 10. Sensor 100 captures an image or other information from which locations of fiducial markers 40 can be derived, and transmits this information to fiducial position determination module 210, which is a computer executed module executing instructions for determining spatial locations of the fiducial markers that appear in the image or other information from sensor 100. The fiducial locations are then input to a pattern recognition module 220, which is a computer executed module that executes instructions for classifying the spatial locations of fiducial markers 40 into predetermined seatbelt 20 usage configurations. That is, the pattern recognition module 220 outputs the configuration of the seatbelt 20 as it is being worn by driver 50. As above, the particular seatbelt usage configurations may be any configurations. In one embodiment, the configurations into which the pattern recognition module 220 may classify seatbelt usage may include 1) a properly worn seatbelt (FIG. 1A), i.e., with the shoulder strap extending over the shoulder of driver 50 and extending diagonally down across the wearer's torso to buckle 80, 2) a seatbelt which is off (FIG. 1B), or not being worn (including use of known seatbelt warning stoppers and the like), 3) a seatbelt that is buckled properly but which extends under the shoulder and left arm of driver 50 (FIG. 1C), rather than over the wearer's shoulder as is proper, and 4) a seatbelt that is buckled properly but which extends behind the driver 50 rather than properly extending over the front of driver 50 (FIG. 1D). These four cases may be referred to herein as, respectively, "Case On," "Case Off," "Case Under," and "Case Back."

The fiducial position determination module 210 may determine the spatial locations of fiducial markers 40 from input sensor 100 data in any manner. In some exemplary embodiments, module 210 may employ known computer vision-based detection processes that detect objects such as fiducial markers 40 without using neural networks, such as edge detection methods, feature searching methods, probabilistic face models, graph matching, histograms of oriented gradients (HOGs) fed into classifiers such as support vector machines, HaarCascade classifiers, and the like. Spatial locations of detected fiducial markers 40 in an image may then be determined or estimated in any manner, such as via tabulated locations corresponding to each pixel location and determined according to an estimation of distances between the sensor 100 and positions on a model or simulated driver. In some other exemplary embodiments, module 210 may employ neural network-based object recognition methods such as those employing deep neural network (DNN) object recognition and position determination schemes, as well as any others. For example, a DNN may be trained to recognize fiducial markers 40 and their positions, using a training set of labeled images of fiducial markers and their spatial location information. Training of such DNNs may be carried out in known manner.

Figure 2B:
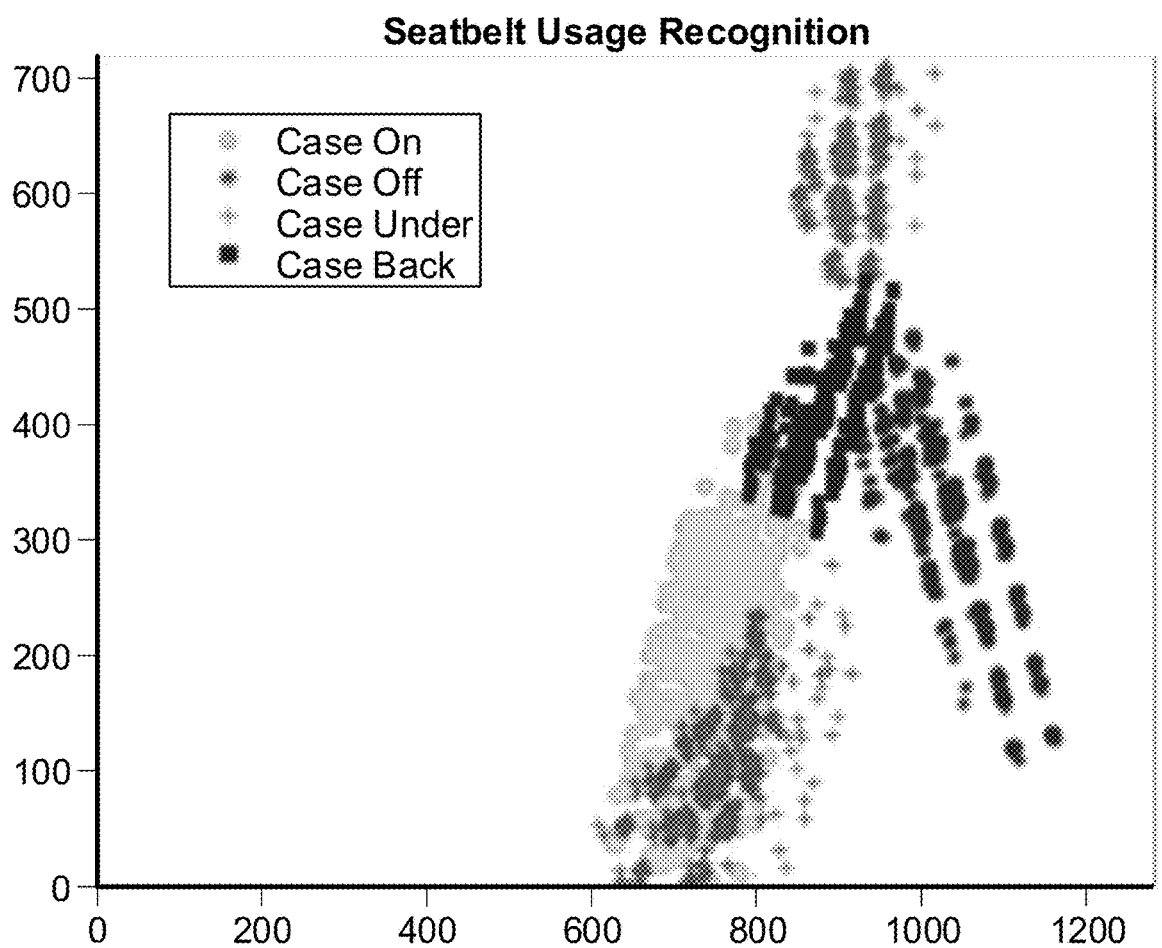
FIG. 2B is a graph illustrating detected fiducial marker positions according to embodiments of the disclosure.

The pattern recognition module 220 may classify the spatial location information of the various fiducial markers 40 into the above seatbelt position cases, in any manner. In some exemplary embodiments, module 220 may employ one or more machine learning-based classification methods. FIG. 2B is a graph illustrating detected fiducial marker positions determined via experiment. As can be seen, seatbelt fiducial markers 40 typically lie within well-defined spatial regions depending on which usage case occurs. For example, in Case On, when a seatbelt 20 is properly worn, its fiducial markers 40 generally lie along a diagonal band extending from the top left of the driver 50 to his or her bottom right, as shown by the diagonal cluster of points extending from the center of the graph of FIG. 2B to the lower left. Similarly, in Case Off, the seatbelt 20 is not worn and thus hangs down to the left of driver 50, as shown by the downward-extending band of points extending generally from the center of FIG. 2B to the lower right.

In this embodiment, fiducial markers 40 position themselves in well-defined clusters according to their use. It can be observed that seatbelt usage cases may be determined according to any method of classifying defined clusters of points in a space. For example, a k-nearest neighbor model may be trained to determine whether fiducial marker 40 points belong to any of the clusters shown in FIG. 2B, as each cluster corresponds to a specific case. Alternatively, any classification-based model may be employed to determine spatial regions corresponding to each of the four cases of FIG. 2B, where input fiducial marker 40 positions can be classified by pattern recognition module 220 according to which spatial region they fall within. Similarly, any regression-based model may be employed to characterize each cluster of points corresponding to each specific case, where input fiducial marker 40 positions can be classified according to which characterized cluster they are nearest.

Figure 2C:
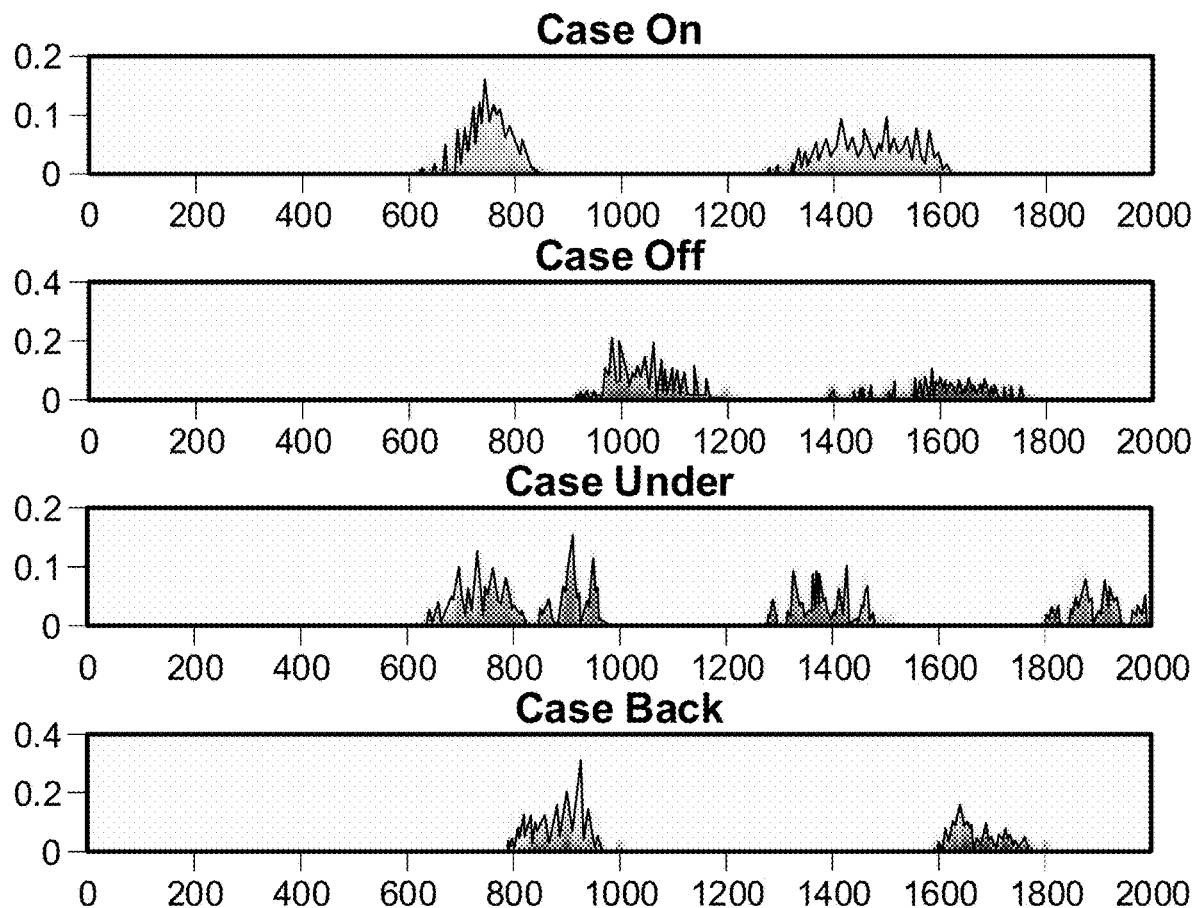
FIG. 2C is a graph of position points of FIG. 2B for illustrating seatbelt position determination according to embodiments of the disclosure.

As a further alternative, fiducial marker 40 positions may be classified according to characteristic distributions or ranges of their location points. FIG. 2C illustrates one such example. Here, the same fiducial marker 40 location points shown in FIG. 2B are presented in different form, with the x-axis of FIG. 2C representing the location where tags are detected in the x direction of an input image, and the y-axis representing the number of fiducial markers 40 found to be at that x-location. As can be seen, each seatbelt usage case has a characteristic distribution when the positions of its fiducial markers 40 are plotted in this manner. For example, Case On has a distinctive distribution, with a cluster of marker 40 locations falling within approximately the 620-820 range and within the 1250-1600 range. Similarly, Case Off has a cluster of marker 40 locations in approximately the 1000-1180 range, as well as a more diffuse distribution lying within the 1400-1780 range. Accordingly, marker 40 locations can be classified according to their distributions when plotted as shown in FIG. 2C. Thus, for instance, sensor 100 may capture an image of the seatbelt 20 and fiducial markers 40, and the fiducial position determination module 210 may determine the locations of the fiducial markers 40 captured in the image. Pattern recognition module 220 may then determine which distribution of FIG. 2C is most similar to the corresponding distribution of marker 40 locations in the input image, and classify the image, i.e., the current state of the seatbelt 20, accordingly. Similarity may be measured in any manner. For example, mean or median values of each distribution, or any other characteristic value thereof, may be determined and compared to mean/median or other characteristic values of each distribution shown in FIG. 2C. The closest comparisons may then be selected as the classification, or corresponding case, for the input image.

Figure 3:
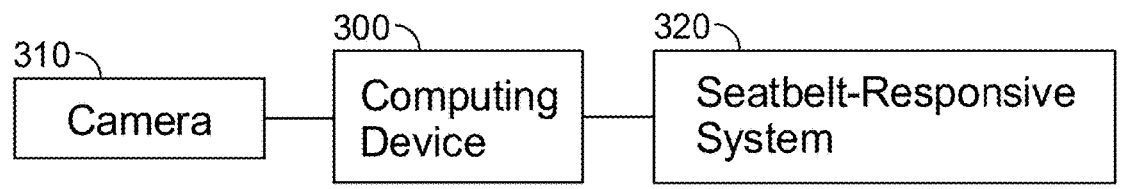
FIG. 3 is a block diagram representation of a seatbelt position detection system of embodiments of the disclosure.

FIG. 3 is a block diagram representation of one exemplary seatbelt position detection system of embodiments of the disclosure. Here, computing device 300, which may be any electronic computing device containing processing circuitry capable of carrying out the seatbelt position detection operations of embodiments of the disclosure, is in electronic communication with both a camera 310 and a seatbelt-responsive system 320. In operation, camera 310 captures and transmits images of a subject to computing device 300, which then implements modules 210 and 220 of FIG. 2A, determining from the image of camera 310 the corresponding seatbelt use case (e.g., Case On, Case Off, Case Under, or Case Back). The computing device 300 transmits this Case to seatbelt-responsive system 320, which takes an action or performs one or more operations in response.

Seatbelt-responsive system 320 may be any system capable of performing one or more actions based on the seatbelt usage case it receives from computing device 300. Any configurations of camera 310, computing device 300, and gaze-assisted system 320 are contemplated. As one example, the seatbelt-responsive system 320 may be an autonomous vehicle capable of determining and reacting to the seatbelt usage state of the driver or another passenger. In this example, camera 310 and computing device 300 may be positioned within the vehicle, while the seatbelt-responsive system 320 may represent the vehicle itself. The camera 310 may correspond to camera 441 of FIGS. 4A and 4C below, and may be positioned at any location within the vehicle that allows it a view of the driver or passenger. Accordingly, camera 310 may capture images of the driver and his or her seatbelt and transmit them to computing device 300, which calculates the spatial positions of visible fiducial markers 40 and determines the corresponding seatbelt usage state of the driver. Usage state may then be transmitted to, for example, another software module that determines actions the vehicle may take in response. For instance, the vehicle may determine that the driver's seatbelt is not being worn (Case Off) or worn improperly (Case Under or Case Back), and may initiate any type of operation in response. Such operations may include any type of warning issued to the driver (e.g., a visual or audible warning, a warning on a heads-up display, or the like), auto-pilot initiation, a braking or turning operation, ignition cutoff, or any other action. Computing device 300 may correspond to computing device 500 of FIG. 5 below, and may be positioned within the vehicle of seatbelt-responsive system 320 as a local processor, or may be a remote processor that receives images from camera 310 and transmits seatbelt usage cases or states wirelessly to the vehicle of seatbelt-responsive system 320.

Figure 4A:
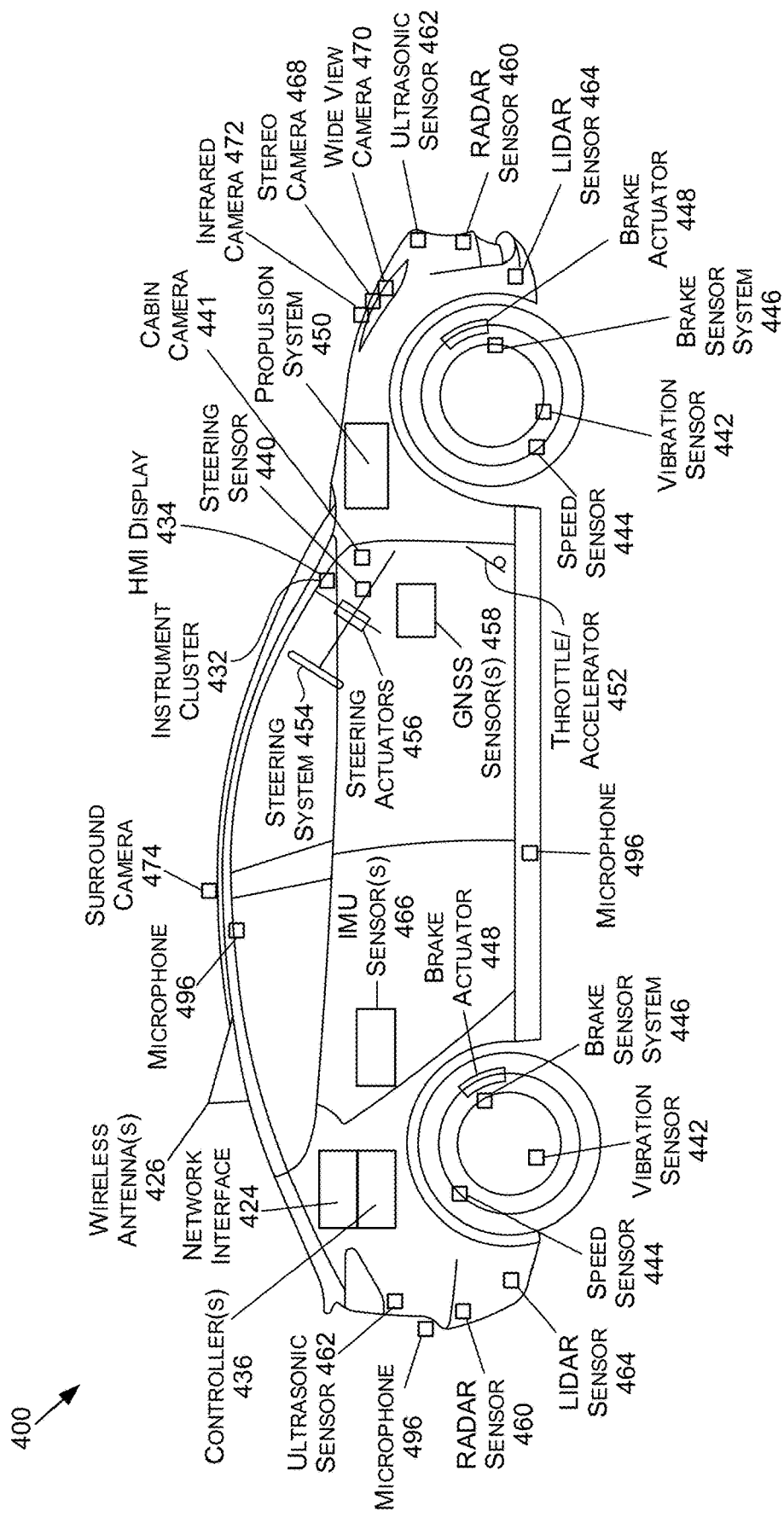
FIG. 4A is an illustration of an example autonomous vehicle, in accordance with some embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 400 may be capable of functionality in accordance with one or more of Level 3-Level 5 of the autonomous driving levels. For example, the vehicle 400 may be capable of conditional automation (Level 3), high automation (Level 4), and/or full automation (Level 5), depending on the embodiment.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more CPU(s), system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, and/or to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) 446 (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the location of the vehicle 400, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424, which may use one or more wireless antenna(s) 426 and/or modem(s) to communicate over one or more networks. For example, the network interface 424 may be capable of communication over LTE, WCDMA, UMTS, GSM, CDMA2000, etc. The wireless antenna(s) 426 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
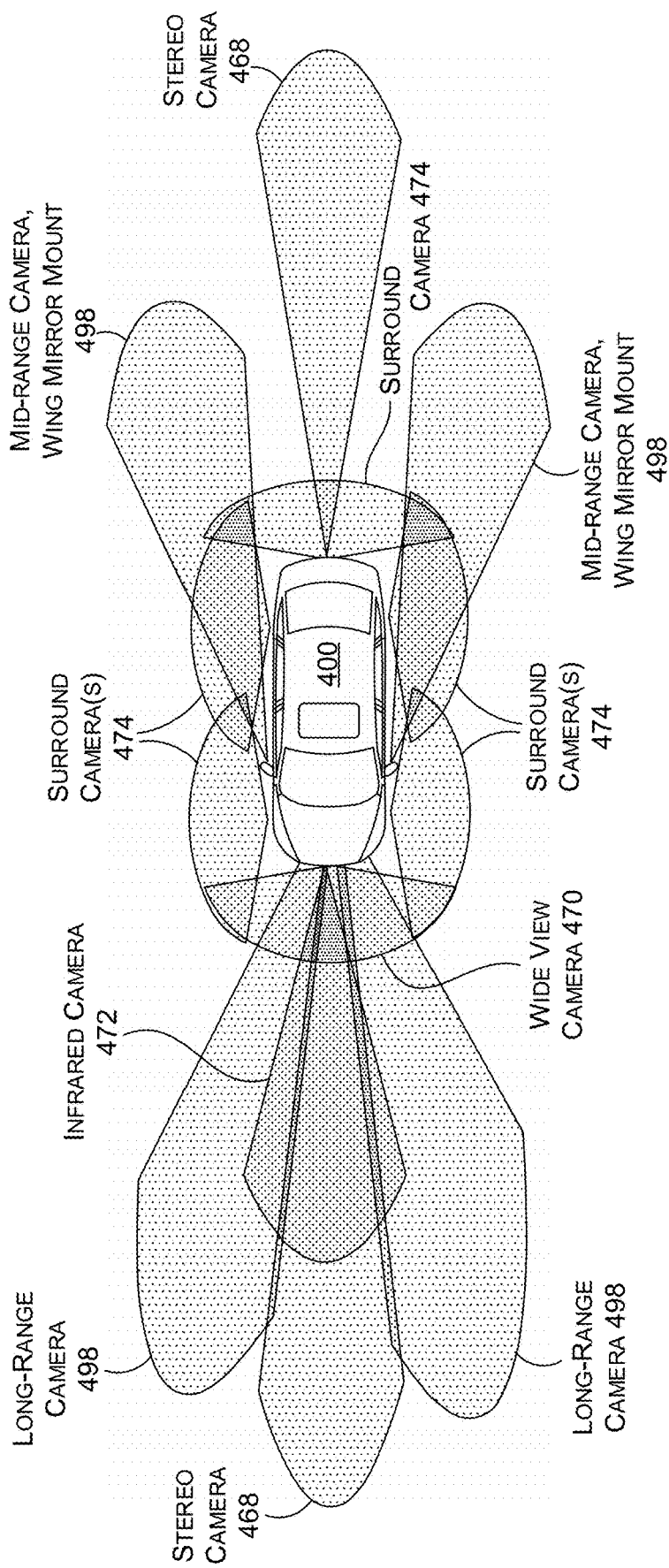
FIG. 4B is an example of camera locations and fields of view for the example autonomous vehicle of FIG. 4A, in accordance with some embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 400 (e.g., front-facing cameras) may be used for surround view, to help identify forward-facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (e.g., FPGA) and a multi-core microprocessor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that includes portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned around the vehicle 400. The surround camera(s) 474 may include wide-view camera(s) 470, fisheye camera(s), 360-degree camera(s), and/or the like. For example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround-view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Cameras with a field of view that include portions of the interior or cabin of vehicle 400 may be used to monitor one or more states of drivers, passengers, or objects in the cabin. Any type of camera may be used including, but not limited to, cabin camera(s) 441, which may be any type of camera described herein, and which may be placed anywhere on or in vehicle 400 that provides a view of the cabin or interior thereof. For example, cabin camera(s) 441 may be placed within or on some portion of the vehicle 400 dashboard, rear view mirror, side view mirrors, seats, or doors and oriented to capture images of any drivers, passengers, or any other object or portion of the vehicle 400.

Figure 4C:
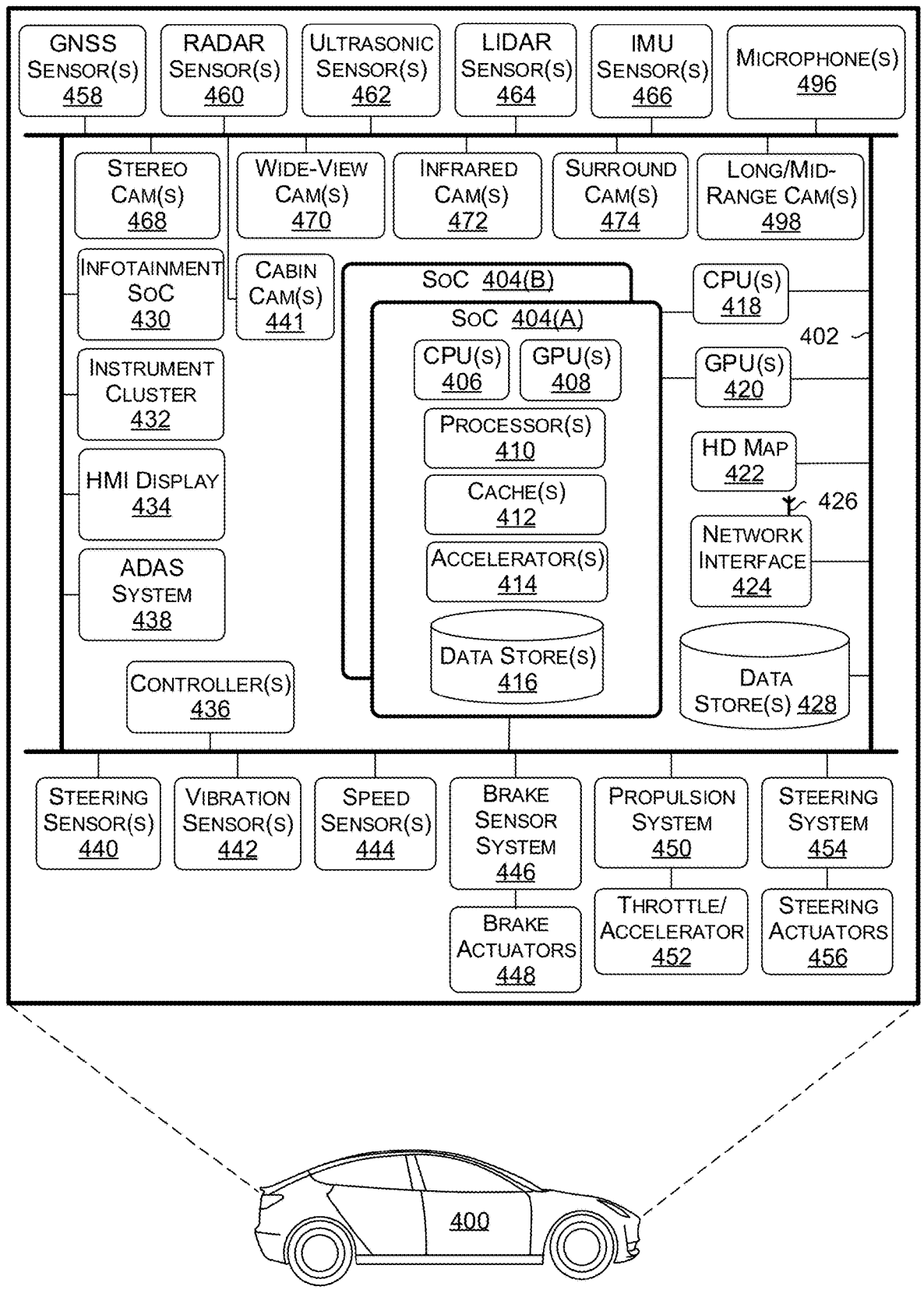
FIG. 4C is a block diagram of an example system architecture for the example autonomous vehicle of FIG. 4A, in accordance with some embodiments of the present disclosure.

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C is illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400 and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use computer-based application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting, and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected to both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 416 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe-stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and actively performing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always-on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, which use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 426 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include an SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 400 may further include data store(s) 428, which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458 (e.g., GPS and/or assisted GPS sensors), to assist in mapping, perception, occupancy grid generation, and/or path planning functions. Any number of GNSS sensor(s) 458 may be used, including, for example and without limitation, a GPS using a USB connector with an Ethernet to serial (RS-232) bridge. The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data, in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 400 at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 460 m (front) or 80 m (rear), and a field of view of up to 42 degrees (front) or 450 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 100 m, with an accuracy of 2 cm-3 cm, and with support for a 100 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 200 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include an SoC, in some examples. The ADAS system 438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjusts the vehicle speed to maintain a safe distance from vehicles ahead. Lateral ACC performs distance keeping, and advises the vehicle 400 to change lanes when necessary. Lateral ACC is related to other ADAS applications such as LC and CWS.

CACC uses information from other vehicles that may be received via the network interface 424 and/or the wireless antenna(s) 426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 400), while the I2V communication concept provides information about traffic farther ahead. CACC systems may include either or both I2V and V2V information sources. Given the information of the vehicles ahead of the vehicle 400, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network that is trained and thus reduces the risk of false positives, as described herein.

The vehicle 400 may further include the infotainment SoC 430 (e.g., an in-vehicle infotainment system (IVI)). Although illustrated and described as an SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 400. For example, the infotainment SoC 430 may include radios, disk players, navigation systems, video players, USB and Bluetooth connectivity, carputers, in-car entertainment, Wi-Fi, steering wheel audio controls, hands-free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe-stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
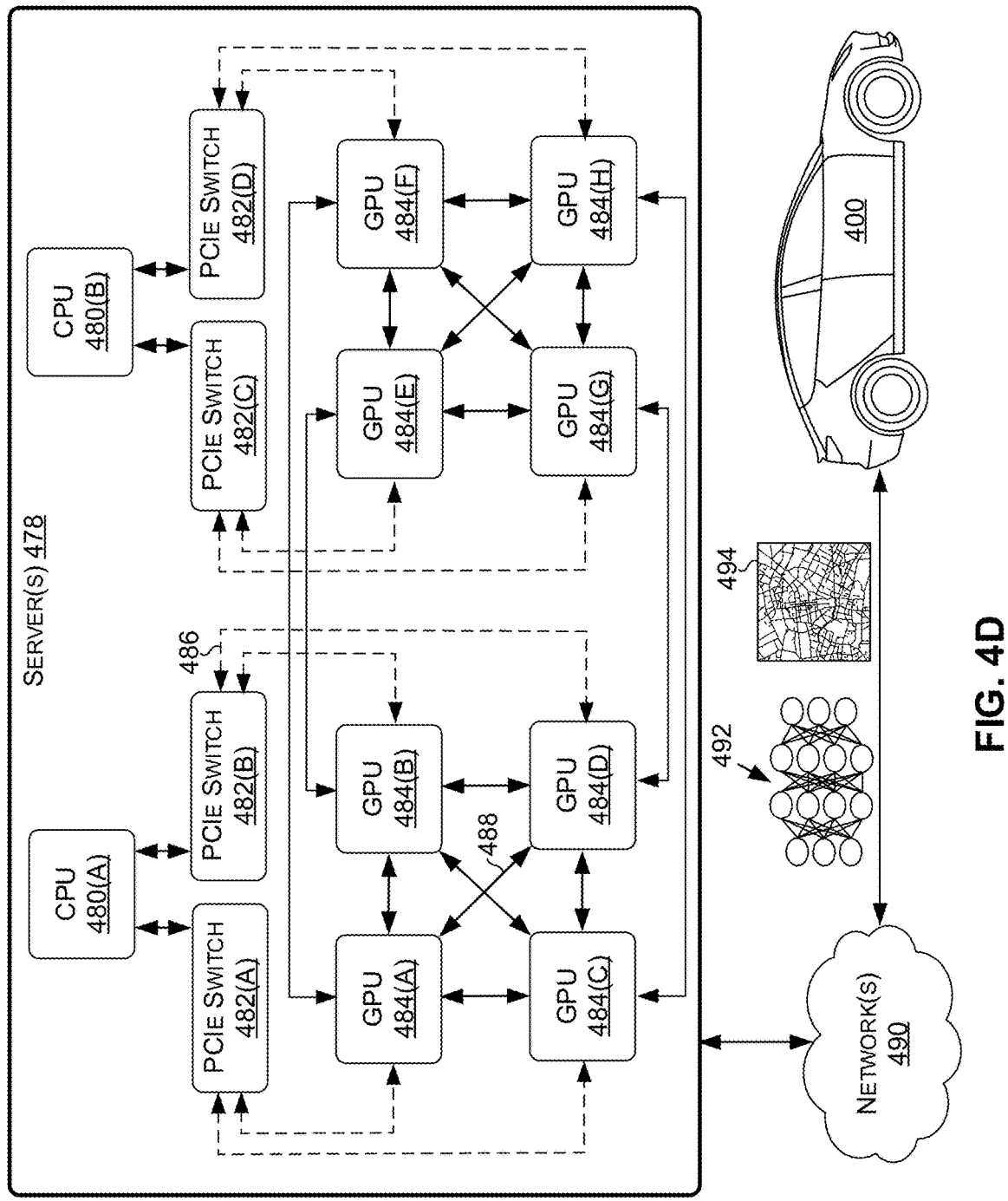
FIG. 4D is a system diagram for communication between cloud-based server(s) and the example autonomous vehicle of FIG. 4A, in accordance with some embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced roadwork. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Figure 5:
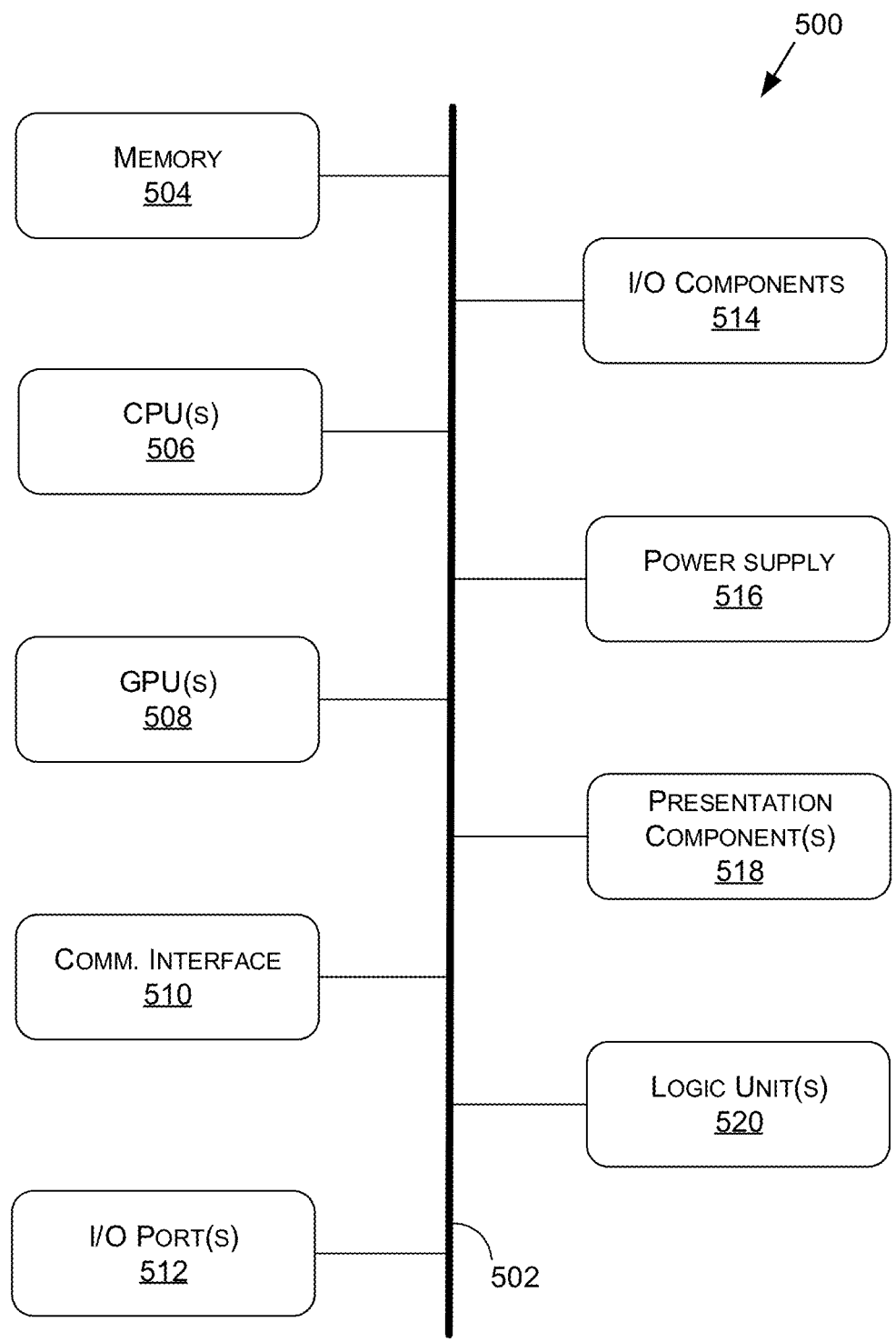
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, I/O ports 512, input/output components 514, a power supply 516, one or more presentation components 518 (e.g., display(s)), and one or more logic units 520.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point, connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, including wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built into (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

Figure 6:
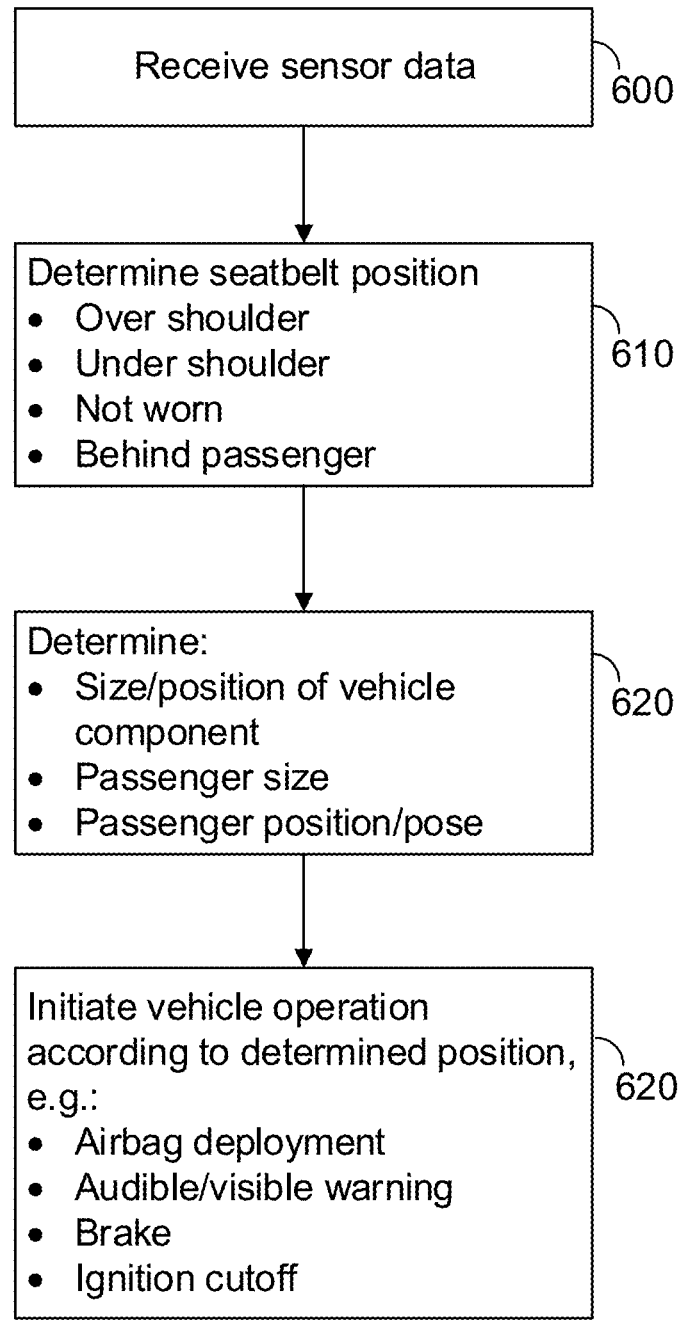
FIG. 6 is a flowchart illustrating process steps for determining seatbelt position in accordance with embodiments of the disclosure.

FIG. 6 is a flowchart illustrating process steps for determining seatbelt position states in accordance with embodiments of the disclosure. Here, computing device 300 first receives sensor data from a sensor monitoring seatbelt 20 on driver 50, e.g., camera 310 (Step 600). As above, this sensor data is any data which may be used to determine the spatial locations of fiducial markers 40, such as image data from camera 310. Computing device 300 then determines the position of seatbelt 20 (Step 610), such as whether the seatbelt 20 position falls into one of the above described usage cases. In particular, fiducial position determination module 416 may determine the locations of each fiducial marker 40 in its input image or other data, and pattern recognition module 418 may then select a particular classification or seatbelt usage state (e.g., Case On, Case Off, Case Under, or Case Back) from the determined marker 40 locations.

Optionally, the computing device 300 may also determine other quantities besides seatbelt usage state (Step 620). For example, device 300 may also determine the size or position of various vehicle components. Fiducial markers 40 may be placed on any vehicle component, or any object within the vehicle, and the sensor 100 may be oriented to capture images or position information of these additional fiducial markers 40. Device 300 may then determine position states of these components or objects as above, classifying them into various states as appropriate. For example, fiducial markers 40 may be placed on the backrest portion 60 and/or seatrest portion 70 of a vehicle seat, and device 300 may determine usage states of the driver's (or other passenger's) seat. In this manner, device 300 may determine, for instance, whether the driver's seat is in a reclined state, or has been moved far forward or far back, and may inform the vehicle to take various actions such as redirecting heating/cooling vents or alerting the driver that his or her seat is in an improper position for driving. Fiducial markers 40 may also be placed on objects within the vehicle, such as child seats or boosters. Device 300 may then determine the locations of these objects within the vehicle according to embodiments of the disclosure, determining for example whether objects are within a seat and/or oriented correctly, according to characteristic distributions of fiducial marker 40 locations when the object is properly positioned. Thus, for instance, device 300 may determine whether child car seats or booster seats are properly installed, have shifted in position over time, or the like, and inform the vehicle accordingly. In another embodiment, device 300 may determine if cargo within the vehicle's passenger compartment is safely positioned.

As another example, the device 300 may determine passenger or driver size. In particular, the size of passengers may be determined from seatbelt contours, i.e., the locations of the various fiducial markers 40 as they contour to the driver or passenger's body. For example, machine learning models of fiducial position detection module 416 may be trained to classify clusters of fiducial marker 40 locations for drivers/passengers of various weights, dimensions, or volumes. Locations of markers 40 in input images may thus be classified according to the driver/passenger weight corresponding to the cluster most closely matched. This may inform the system of the approximate weight of the driver/passenger, thus informing the vehicle if, for example, airbags should be deployed in case of a collision. Alternatively, the vehicle may use the information to regulate to what degree or how an airbag is deployed. For example, various portions of a vehicle cocoon airbag may be deployed, or not deployed, based on passenger size. To assist in more accurate determination of driver/passenger size, fiducial markers 40 may be placed in additional locations to the seatbelt shoulder strap, such as on lapbelt 30 and/or seat backrest portion 60.

As a further example, the position or pose of a passenger may be determined by the positions of the fiducial markers as they conform to passengers who move around in their seats. For example, machine learning models of fiducial position detection module 416 may be trained to classify clusters of fiducial marker 40 locations for drivers/passengers in various poses. Locations of markers 40 in input images may thus be classified according to the driver/passenger pose corresponding to the cluster most closely matched. This may inform the vehicle as to, for instance, drivers/passengers that have fallen asleep and thus slumped down in their seat, children that have attempted to stand up in their seats, drivers who are turned around and thus not viewing the road, and the like. By training the machine learning models of fiducial position detection module 416 using images of any driver/passenger position or pose of concern, device 300 may determine any driver/passenger position capable of being inferred by seatbelt position.

In some embodiments of the disclosure, Step 620 is optional and may be omitted if desired. Once seatbelt usage state has been selected and/or any other driver or passenger quantity has been determined, i.e., upon completion of either Step 610 or Step 620, system 300 may then initiate a vehicle operation accordingly (Step 620). As above, any vehicle operation may be initiated. Such vehicle operations may include airbag deployment or adjustment (e.g., disabling airbag deployment when a small passenger such as a child is detected), any audible or visible warning such as a warning indicator light, alarm bell or other signal, or a speech- or text-based warning. In more urgent situations, e.g., perhaps when a seatbelt becomes dislodged or unbuckled suddenly, vehicle operations may include braking, ignition cutoff or engine disabling, autopilot engagement, or the like. In some embodiments, seatbelt usage states may be transmitted away from the vehicle. For example, in fleet management situations, it may be important to know when drivers are wearing their seatbelts or if they are properly wearing their seatbelts. Other situations would also benefit from such a solution, for example monitoring safe driving habits and seatbelt usage may be important to insurance companies or parents.

It is noted that embodiments of the disclosure allow for detection of seatbelt position and usage in both drivers and other passengers. That is, any detected quantities and any resulting operations of any embodiments of the disclosure may be applied to both drivers and any other vehicle occupants. Thus, while FIG. 1A illustrates detection of seatbelt position or usage for a driver, the methods and processes disclosed may be applied equally to any other passengers as well. For example, fiducial markers may be placed on any passenger seatbelt and a sensor 100 may be suitably placed to capture images of these markers, whereupon images or other sensor data may be employed to determine the seatbelt position and usage of such passengers. In this manner, systems of embodiments of the disclosure may determine whether a passenger seatbelt is being properly worn, or whether one or more passengers has an improperly worn seatbelt, whereupon the vehicle may issue a warning or other message to that passenger or to others in the vehicle.

It is also noted that fiducial markers 40 may be any type and shape of marking capable of conveying spatial location information. As one example, fiducial markers 40 may be of any shape and size, and may be formed in any manner. For instance, markers 40 may be visible patches or other visible objects or shapes adhesively attached, sewn, printed, sprayed, projected, or otherwise formed on seatbelt 20. As another example, fiducial markers 40 may be visible in any light range. Thus, for instance, fiducial markers 40 may be markers that are perceptible in visible light frequencies, e.g., visible patches or other indicia. Alternatively, markers 40 may only be perceptible in frequencies outside the visible light spectrum. For instance, markers 40 may be ultraviolet, infrared, or near-infrared markings. As one example, fiducial markers may be first printed in a black ink that is visible in infrared and near-infrared. This black ink may then be coated with another ink layer which appears black in visible light but translucent in infrared and/or near-infrared light. Fiducial markers formed in this manner are thus invisible to passengers and drivers, but perceptible by systems of embodiments of the disclosure.

It is further noted that machine learning models of pattern recognition module 220 may classify fiducial locations into other seatbelt usage cases besides the four specified in conjunction with FIGS. 2B-2C. As one example, an additional case may be added to capture the case of the driver 50 or passenger pushing some portion of the seatbelt 20 away with his or her hand. Here, the machine learning models of pattern recognition module 220 may be trained on an input training set of images that includes images of a driver/passenger pushing a portion of his or her seatbelt away, perhaps labeled with corresponding spatial locations of its fiducial markers 40.

Additionally, machine learning models of embodiments of the disclosure may be trained to handle at least partial occlusion of one or more of the fiducial markers 40. Such occlusion is anticipated to be a possible if not common occurrence. For instance, passenger hair may fall over and thus block sensors 100 from perceiving the fiducial markers 40, loose clothing or hand gestures may similarly block fiducial markers 40, and the like. Machine learning models of both fiducial position determination module 210 and pattern recognition module 220 may thus be trained using images in which at least some of the fiducial markers are partially or completely occluded, and/or fiducial location information that is partial or incomplete, respectively. As one example, a portion of the training set of images input to the machine learning model(s) of embodiments of the disclosure may be images in which at least some of the fiducial markers are partially or completely occluded. In this manner, the machine learning models of embodiments of the disclosure are trained to handle fiducial marker occlusion, thus providing more reliable classification results that remain accurate in a variety of real-world situations.

Further, it is noted that embodiments of the disclosure may additionally initiate or direct automated seatbelt placement operations, perhaps in response to properties determined from detected seatbelt position. As above, detected seatbelt position information may be employed to infer passenger or driver size and/or weight. Embodiments of the disclosure further contemplate initiation of automated vehicle adjustments in response to driver or passenger size/weight. For example, seatbelts 20 and/or seats may be equipped with known adjustment mechanisms configured to automatically tighten or loosen seatbelts 20, or move seats in a particular direction. Accordingly, one or more processors of embodiments of the disclosure may determine that a child is present, and adjust his or her seatbelt to more properly accommodate a smaller body, e.g., lowering and tightening the seatbelt, raising the seat, or the like. As another example, processors of embodiments of the disclosure may determine from seatbelt 20 position that a passenger is improperly positioned in their seat. If upon warning the passenger has not moved from their improper position for some period of time, the passenger's seat or seatbelt 20 may adjust to the passenger's incorrect position, such as by adjusting the seat to place the seatbelt 20 in proper position or tension, or the like. Any adjustment of any component of a vehicle may be performed for any detected passenger or driver size or weight.

Figure 7:
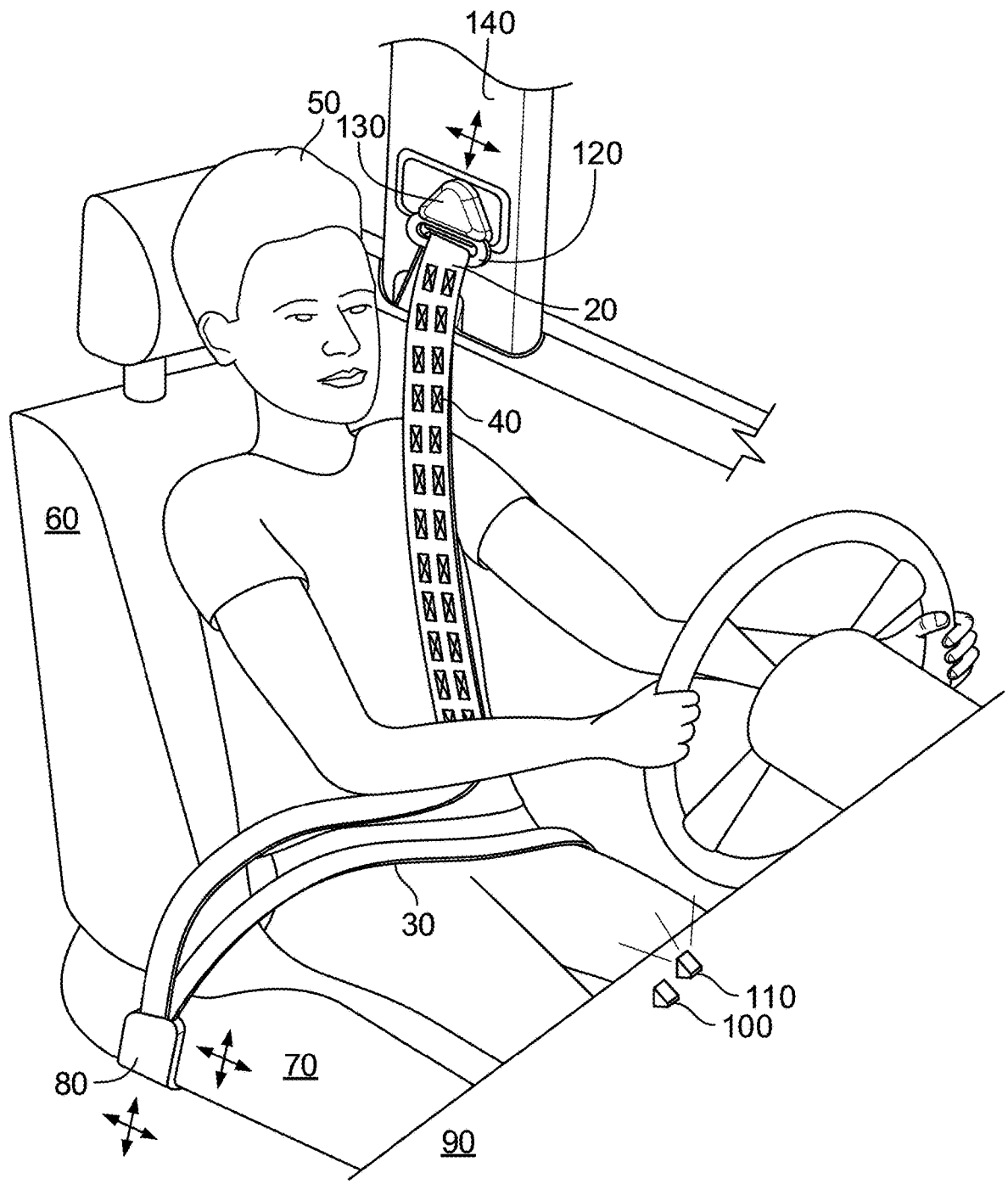
FIG. 7 conceptually illustrates detection and correction of improper seatbelt configurations according to embodiments of the disclosure.

FIG. 7 illustrates exemplary automated seatbelt placement operations in accordance with embodiments of the disclosure. Here, seatbelt 20 may be equipped with a known automated retraction mechanism for retracting the seatbelt 20, e.g., in the direction of the upper arrows in FIG. 7. Similarly, seat 60, 70 may be equipped with known actuation mechanisms for moving seat 60, 70 forward/backward and left/right, in the directions of the lower right arrows. Additionally, buckle 80 may further be equipped with actuation mechanisms for movement forward/backward and left/right, in the directions of the lower left arrows. Anchor 130 may separately or additionally be equipped with actuation mechanisms for movement upward/downward and forward/backward, in the directions if the upper arrows.

In this manner, seatbelt 20 may be automatically adjusted to compensate for any detected improper occupant positions. For example, as shown in FIG. 7, sensor 100 may detect seatbelt 20 as being in an excessively loose configuration, according to a fiducial marker 40 pattern that extends almost vertically along a significant portion of the front of driver 50, rather than diagonally across the driver 50 as would be proper. In response, the vehicle may perform any seatbelt 20, seat 60, 70, buckle 80, or anchor 130 actuation operations to adjust seatbelt 20 to its proper position. These operations may include any one or more of retracting seatbelt 20 to take up the loose and slack portion extending along the front of driver 50, actuating buckle 80 downward and/or backward to tighten seatbelt 20, actuating seat 60, 70 forward to similarly tighten seatbelt 20, actuating anchor 130 upward and/or backward also to tighten seatbelt 20, any combination of any such actuation operations, or any automated movement of any other vehicle portion which may tighten seatbelt 20. Embodiments of the disclosure contemplate detection and characterization of any seatbelt 20 position that may be considered improper, by methods and processes of the disclosure such as those above, and compensation for or adjustment of these improper seatbelt 20 positions by adjustment of any one or more vehicle components.

Embodiments of the disclosure further contemplate use of other sensors in addition to sensor 100, for generating any type of information that may be used in conjunction with the determined seatbelt positions of embodiments of the disclosure to initiate any vehicle operations. Any one or more sensors of any types are contemplated. For instance, weight or pressure sensors may be placed within the seatrest portion 70 underneath driver 50 to measure the weight of driver 50, his or her position within the seat, his or her distribution of weight, or the like. Similarly, other weight or pressure sensors may be placed within other seats to measure weights of passengers. Systems of embodiments of the disclosure may thus determine which seats are occupied, and the weights of passengers or drivers occupying seats. Weight and seatbelt 20 position information may then be used together to determine the appropriate tension for seatbelt 20, whereupon the vehicle may automatically adjust the seatbelt to that tension by adjusting the positions of, e.g., buckle 80, anchor 130, and/or seat 60, 70.

Any quantities may be determined and employed in conjunction with seatbelt 20 positions, to determine any quantities and initiate any operations in response. As one example, the distribution of passenger weight and their position as determined from fiducial marker 40 positions may together be used to determine that a passenger is seated improperly, e.g., seated or leaning too far to one side, too far forward, a child seat is improperly placed (perhaps using fiducial markers 40 placed on the child seat), or the like. In response, the vehicle may initiate various operations, such as tightening seatbelt 20 to pull the passenger or driver back into position, adjusting the seat 60, 70 to move the passenger or driver into proper position, or the like. As another example, the weight and fiducial marker 40 positions of a driver 50 or other passenger may be used to determine their bodily dimensions, e.g., height and width. The vehicle may then adjust the positions of anchor 130, buckle 80, or the like, to more properly position seatbelt 20 on the driver/passenger, such as by raising anchor 130 to accommodate taller drivers, moving anchor 130 rightward (in the view of FIG. 7) to adjust seatbelt 20 for drivers with broad shoulders, and the like. In this manner, driver or passenger properties such as height or other dimensions may be inferred from both fiducial marker 40 positions and other sensor data such as weight, and seatbelts 20 may be automatically adjusted to more optimally fit those particular driver/passenger dimensions. Thus, embodiments of the disclosure allow for seatbelts 20 that automatically (and, if desired, continuously) adjust to more proper positions on each driver or passenger, thus improving safety during vehicle operation.

Embodiments of the disclosure additionally contemplate determination of properties such as vehicle vibration from determined positions of fiducial markers 40. More specifically, the frequency and magnitude of vibration may be determined from the recorded movement of fiducial markers 40 over time. Vehicle vibration may be determined from fiducial marker 40 movement in any manner, such as by initially determining a baseline or neutral set of marker 40 positions, and subsequently tracking the relative movement of this baseline set as a function of time. Marker 40 locations may be determined via any approach, such as by known computer vision methods for identifying an object and determining its spatial location, machine learning methods employing one or more machine learning models trained to identify and determine the position of particular objects, or the like.

Determined vehicle vibration may be utilized in any manner. For example, component frequencies of the determined vibration, and their corresponding magnitudes, may be identified in known manner, and employed to determine various aspects of vehicle function or loading. Thus, for instance, baseline frequencies and magnitudes may be identified and recorded as above, and certain frequencies may be identified as corresponding to sources such as baseline engine operation, road noise, or the like. Systems of embodiments of the disclosure may then alert the vehicle or passengers to deviations from such baselines. In this manner, systems of embodiments of the disclosure may identify occurrences of abnormal engine operation, vehicle component breakdowns, vehicle damage, dangerous or potentially damaging road conditions, and the like, and alert the vehicle or driver to take corrective actions.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any fiducial markers of any size and/or shape, and visible in any light wavelength, may be used. Fiducial marker positions may be determined in any manner, and resulting seatbelt use cases may be classified in any manner, to result in any desired classifications. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A system comprising:
   one or more processing units to:
   generate, using sensor data generated using a sensor, an image depicting one or more fiducial markers disposed on a seatbelt of a vehicle;
   determine, based at least on the image, one or more numerical values indicating one or more coordinate locations associated with the one or more fiducial markers as depicted within the image;
   determine, based at least on the one or more numerical values, a distribution associated with the one or more fiducial markers;
   compare the distribution to at least a first distribution of locations associated with the seatbelt being used properly and a second distribution of locations associated with the seatbelt not being used properly;
   determine, based at least on the comparison of the distribution to the first distribution of locations and the second distribution of locations, whether a position of the seatbelt is associated with the seatbelt being used properly; and
   initiate an operation of the vehicle based at least on whether the position of the seatbelt is associated with the seatbelt being used properly.

2. The system of claim 1, wherein:
   the first distribution of locations is associated with a passenger wearing the seatbelt properly when the position of the seatbelt corresponds to extending over a shoulder of the passenger; or
   the second distribution of locations is associated with the passenger not wearing the seatbelt properly when the position of the seatbelt corresponds to one of:
   the seatbelt extending under the shoulder of the passenger; or
   the seatbelt extending behind the passenger.

3. The system of claim 1, wherein the one or more processing units are further to determine, using one or more learning models and based at least on the image, one or more classifications associated with the one or more fiducial markers.

4. The system of claim 3, wherein the determination of whether the position of the seatbelt is associated with the seatbelt being used properly is further based at least on at least on the one or more classifications.

5. The system of claim 1, wherein the one or more processing units are further to perform one or more of:
   determine, based at least on the one or more numerical values indicating the one or more coordinate locations associated with the one or more fiducial markers, a size or a position of a component of the vehicle;
   determine, based at least on the one or more numerical values indicating the one or more coordinate locations associated with the one or more fiducial markers, a size of a passenger wearing the seatbelt; or
   determine, based at least on the one or more numerical values indicating the one or more coordinate locations associated with the one or more fiducial markers, a position or a pose of the passenger wearing the seatbelt.

6. The system of claim 5, wherein the one or more processing units are further to initiate the operation of the vehicle based at least on one or more of the size or the position of the component, the size of the passenger, or the position or the pose of the passenger.

7. The system of claim 1, wherein the operation is one or more of an airbag deployment, an audible warning, a visible warning, a braking operation, an ignition cutoff, or a movement of one or more of a seatbelt anchor, the seatbelt, or at least a portion of a seat.

8. The system of claim 1, further comprising an illumination source positioned to illuminate the one or more fiducial markers while the sensor generates the sensor data.

9. The system of claim 8, wherein the illumination source is an infrared illumination source, and wherein the sensor is an infrared sensor.

10. The system of claim 1, wherein the one or more fiducial markers are distributed at least along a length of a shoulder harness of the seatbelt.

11. The system of claim 1, wherein the determination of the one or more numerical values indicating the one or more coordinate locations associated with the one or more fiducial markers uses one or more machine learning models.

12. The system of claim 1, wherein the determination of the one or more numerical values indicating the one or more coordinate locations associated with the one or more fiducial markers comprises:
   determining that one or more portions of the image represent the one or more fiducial markers; and
   determining, based at least on the one or more portions of the image, the one or more numerical values indicating the one or more coordinate locations associated with the one or more fiducial markers.

13. The system of claim 1, wherein the one or more numerical values indicating the one or more coordinate locations associated with the one or more fiducial markers comprise:
   one or more first numerical values indicating the one or more coordinate locations associated with the image in a first coordinate direction; and
   one or more second numerical values indicating the one or more coordinate locations associated with the image in a second coordinate direction.

14. The system of claim 1, wherein the one or more numerical values indicating the one or more coordinate locations associated with the one or more fiducial markers comprise:
   one or more first numerical values indicating one or more rows of the image associated with the one or more coordinate locations; and
   one or more numbers of fiducial markers that are located in an individual row of the one or more rows of the image.

15. The system of claim 1, wherein the one or more coordinate locations associated with the one or more fiducial markers comprise one or more pixel locations within the image that depict the one or more fiducial markers.

16. A method comprising:
   receiving sensor data generated using a sensor, the sensor data associated with one or more fiducial markers positioned on a seatbelt of a vehicle;
   determining, based at least on the sensor data, one or more values indicating one or more spatial locations associated with the one or more fiducial markers within the vehicle;
   determining, based at least on the one or more values, a distribution associated with the one or more fiducial markers;
   comparing the distribution to at least a first distribution of locations associated with the seatbelt being used properly and a second distribution of locations associated with the seatbelt not being used properly;
   determining, based at least on the comparing the distribution to the first distribution of locations and the second distribution of locations, whether a position of the seatbelt is associated with the seatbelt being used properly; and
   initiating an operation of the vehicle based at least on whether the position of the seatbelt is associated with the seatbelt being used properly.

17. The method of claim 16, wherein the position of the seatbelt is one of:
   a first position of the seatbelt in which the seatbelt extends over a shoulder of a passenger;
   a second position of the seatbelt in which the seatbelt extends under the shoulder of the passenger; or
   a third position of the seatbelt in which the seatbelt extends behind the passenger.

18. The method of claim 16, wherein the operation is one or more of an airbag deployment, an audible warning, a visible warning, a braking operation, an ignition cutoff, or a movement of one or more of a seatbelt anchor, the seatbelt, or at least a portion of a seat.

19. The method of claim 16, wherein the sensor data is further associated with one or more second fiducial markers positioned on a seat of the vehicle, and wherein the method further comprises determining, based at least on the sensor data, a position of the seat of the vehicle.

20. The method of claim 16, further comprising one or more of:
   determining, from the position of the seatbelt, a size or a position of a portion of the vehicle;
   determining, from the position of the seatbelt, a size of a passenger wearing the seatbelt; or
   determining, from the position of the seatbelt, a position or a pose of the passenger.

21. The method of claim 20, wherein the initiating is further based at least on one or more of the size or the position of the portion of the vehicle, the size of the passenger, or the position or the pose of the passenger.

22. The method of claim 16, wherein:
   the first distribution of locations indicates a first range of locations associated an image;
   the second distribution of locations indicates a second range of locations associated with the image; and
   the comparing the distribution to the first distribution of locations and the second distribution of locations comprises determining whether the distribution is within the first range of locations or within the second range of locations.

* * * * *